July 14, 1959 S. E. BRADSHAW ET AL 2,894,863
PRODUCTION OF SEMI-CONDUCTOR BODIES
Filed Nov. 27, 1956
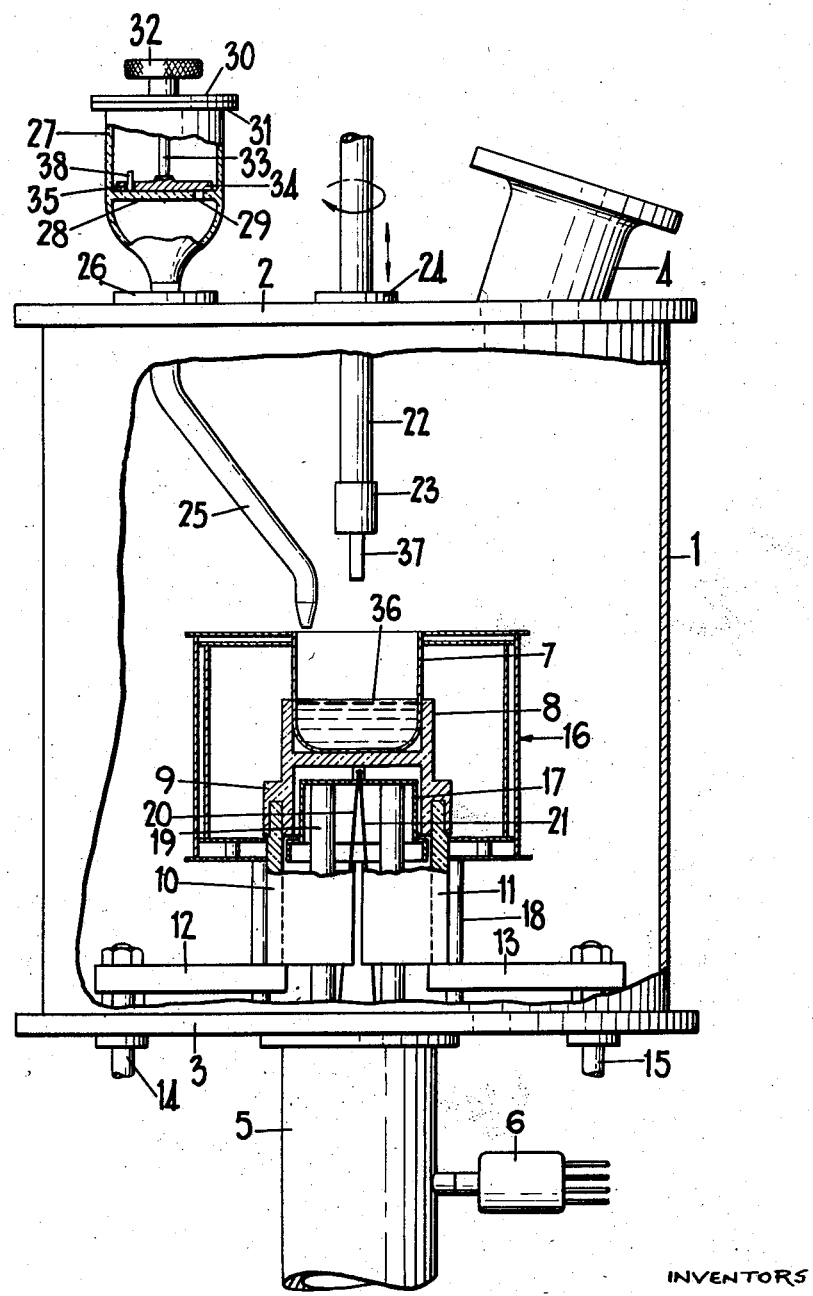
INVENTORS
STANLEY EDWIN BRADSHAW
ABRAHAM ISAAC MLAVSKY
BY
Finschstein, Finschstein & Ottinger
ATTORNEYS

United States Patent Office 2,894,863
Patented July 14, 1959

2,894,863

PRODUCTION OF SEMI-CONDUCTOR BODIES

Stanley Edwin Bradshaw, Harrow Weald, and Abraham Isaac Mlavsky, London, England, assignors to The General Electric Company Limited, London, England Application November 27, 1956, Serial No. 624,614

Claims priority, application Great Britain December 15, 1955

6 Claims. (Cl. 148—1.5)

This invention relates to the production of semiconductor bodies.

The invention is concerned in particular with methods of producing semiconductor bodies of the kind in which a molten mass of a semiconductor is progressively solidified. In such a method, it is often required that the resultant body should contain at least one transition between regions having appreciably different electrical conduction characteristics; for example it may be required that the body should contain at least one P-N junction. The methods which have hitherto been used to achieve such a result have normally involved either the addition of at least one significant impurity to the molten material during its solidification or variation of the rate of solidification so as to vary the effective partition coefficient of at least one significant impurity present in the molten material. Both of these alternatives have the disadvantage that the overall impurity content of the molten material is increased, this disadvantage being particularly severe in cases where it is required to produce a large number of transitions in the resultant body.

It is an object of the present invention to provide a method of the kind specified which is improved in this respect.

According to the invention, in a method of producing a semiconductor body in which a molten mass of silicon is progressively solidified at least one transition between regions having appreciably different electrical conduction characteristics is caused to occur in the resultant body by bringing about during the solidification evaporation from the molten silicon of an appreciable quantity of antimony which has previously been incorporated in the molten silicon.

Antimony acts as a donor impurity in silicon, and thus, depending on the quantity of antimony evaporated and the nature of the total significant impurity content of the molten silicon immediately prior to the evaporation of the antimony, the transition may be from N-type silicon to P-type silicon, from relatively low resistivity N-type silicon to relatively high resistivity N-type silicon, or from relatively high resistivity P-type silicon to relatively low resistivity P-type silicon, the material solidified immediately before the evaporation of the antimony being of the first mentioned kind in each case.

A sharp transition may be produced by maintaining the interface between the solid and molten silicon stationary during the evaporation of the antimony; alternatively, a graded transition may be produced by allowing a relatively small fraction of the molten silicon to solidify during the evaporation of the antimony.

In one preferred embodiment of the invention, a series of transistions is caused to occur in the manner specified above at different stages during the solidification, antimony being added to the molten silicon at appropriate stages during the solidification so that the concentration of antimony in the molten silicon has substantially the same value immediately prior to each evaporation operation, and the evaporation operations being carried out so that the concentration of antimony in the molten silicon has substantially the same value (which may be substantially zero) immediately after each evaporation operation.

According to one aspect of the invention, in a method of producing a semiconductor body in which a molten mass of silicon is progressively solidified the following operations are carried out repeatedly in the order stated: solidifying part of the molten silicon at a time when its significant impurity content is such that the solidifying silicon is of P-type conductivity, adding to the molten silicon a quantity of antimony sufficient to bring about a reversal of the conductivity type of the solidifying silicon, solidifying a further part of the molten silicon, and halting the solidification under such conditions and for such a time that substantially all the antimony remaining in the molten silicon evaporates from the molten silicon.

One method in accordance with the invention will now be described by way of example with reference to the accompanying drawing, which is a side elevation, partly cut away to show internal details which are partly shown in section, of an apparatus for preparing single crystals of silicon.

Referring to the drawing, the apparatus includes a hermetically sealed enclosure constituted by a tubular metal member 1 to the ends of which are sealed top and base metal plates 2 and 3 respectively, the top plate 2 having sealed to it an inspection port 4 across the outer end of which is sealed a quartz window (not visible in the drawing) through which operations carried out in the enclosure can be observed. The enclosure is connected to a pumping system (not shown) by a pumping tube 5 to which is connected an ionization gauge 6.

Inside the enclosure is disposed a circular cylindrical crucible 7 of pure fused silica, the crucible 7 being seated within a circular cylindrical graphite cup 8 which is adapted to serve as an electric resistance heater. The cup 8 is formed integral with a downwardly extending circular cylindrical graphite skirt 9 which is split longitudinally so as to form two semi-cylindrical portions each of which has formed in it a slot into which fits one end of one of a pair of semi-cylindrical graphite members 10 and 11 which serve as supports and part of the lead system for the heater 8; the members 10 and 11 are themselves mounted on metal bars 12 and 13, which are in turn secured to metal bolts 14 and 15 which are sealed through the base plate 3 so as to be electrically insulated therefrom. The crucible 7 and heater 8 are surrounded by a heat reflecting metal baffle system 16, and a further heat reflecting baffle 17 is disposed inside the skirt 9; the baffle system 16 and baffle 17 are supported by means of quartz rods such as 18 and 19 which are themselves mounted on a metal spider (not visible in the drawing) which extends across the opening of the pumping tube 5. In operation of the apparatus, the temperature of the heater 8 is measured by means of a noble metal thermocouple including elements 20 and 21, the hot junction of the thermocouple being disposed close to the base of the heater 8 and the cold junction of the thermocouple (not shown) being maintained in melting ice. Besides being utilised to operate an indicating instrument (not shown) the voltage generated by the thermocouple is fed to a control unit (not shown) which is adapted to maintain the temperature of the heater 8 substantially constant at any desired setting by automatic control of the power supply to the heater 8.

The apparatus also includes a holder for a silicon seed crystal which is in the form of a vertically extending rod 22 to the lower end of which is secured a chuck 23, the rod 22 passing through a gland 24 in the top plate 2 and being both vertically movable and rotatable about its longitudinal axis by means of a suitable mechanism (not shown). The apparatus further includes a bent quartz tube 25 which passes through a gland 26 in the top plate 22 and has its lower end in register with the crucible 7. The upper end of the tube 25 is sealed to a quartz dome 27 which has formed across it a partition 28 in which is formed an aperture 29; the upper end of the dome 27 is closed by a ground quartz plate 30 which mates with a ground quartz flange 31 formed on the end of the dome 27, the mating surfaces of the plate 30 and flange 31 being greased to maintain an effective seal between them. The plate 30 is provided with a knob 32 by means of which it can be rotated on the flange 31, and is connected by a rod 33 to a plate 34 which rests on the partition 28 and has formed in it a series of apertures such as 35 spaced around a circle whose centre lies on the axis of the rod 33.

In carrying out the method in accordance with the invention, a quantity of about 100 grams of solid silicon of the "Hyperpure" grade supplied by E. I. du Pont de Nemours and Co. is placed in the crucible 7, the enclosure is evacuated by operating the pumping system so as to establish in the enclosure a vacuum corresponding to a pressure of the order of $10^{-5}$ to $10^{-6}$ millimetres of mercury as measured by the gauge 6, and the crucible 7 and its contents are then heated to a temperature 30° C. above the melting point of silicon by energising the heater 8 so as to form a pool 36 of molten silicon. The molten silicon 36 is maintained at this elevated temperature for about one hour, during which time it is purified by virtue of the evaporation of a large part of the impurities originally present, the enclosure being continuously pumped.

At the end of this time a silicon seed crystal 37 mounted in the chuck 23 and having a horizontal cross-sectional area of 25 square millimetres is dipped into the molten silicon 36 by moving the rod 22 downwards, and the temperature of the molten silicon 36 is lowered to the point at which it begins to solidify on to the seed crystal 37. The rod 22 is then moved vertically upwards at a rate of one millimetre per minute so that silicon from the melt 36 progressively solidifies so as to form a single crystal propagated from the seed crystal 37, this single crystal being in the form of a vertically extending rod having a cross-sectional area of about five square centimetres. In order to ensure homogeneous mixing, the rod 22 is rotated about a vertical axis at a speed of three revolutions per minute while it is being moved upwards.

The silicon which solidifies initially is of P-type conductivity due to the presence of some acceptor impurity such as boron, and has a resistivity of the order of 100 ohm centimetres at room temperature. After a small amount of this material has been solidified, a pellet 38, which has previously been disposed in the aperture 35 in the plate 34, is caused to drop through the tube 25 into the molten silicon 36 by rotating the plates 30 and 34 by means of the knob 32 so that the aperture 35 in the plate 34 comes into register with the aperture 29 in the partition 28; the pellet 38 consists of 20 milligrams of antimony, and in consequence of its addition the material solidifying from the melt 36 rapidly becomes of N-type conductivity with a resistivity of about one ohm centimetre at room temperature. The single crystal is grown for a short distance (say about one millimetre) while the silicon solidifying is of N-type conductivity, and the growth is then stopped for a period of about 15 minutes after which it is restarted at the same rate as before.

During the growing of the single crystal, the enclosure is pumped continuously so that evaporation of the antimony takes place from the molten silicon 36. The amount of antimony evaporating from the molten silicon 36 during the growth of the N-type region as described above is not sufficient to have a large effect on the resistivity of the solidifying material; moreover the effect of the evaporation during this period is counteracted to some extent by the effect of antimony being more soluble in molten silicon than in solid silicon, which tends to increase the concentration of antimony in the molten silicon 36 during the growth of the N-type region. During the period when growth is halted, however, substantially all the remaining antimony evaporates from the molten silicon 36, so that when growth is restarted the silicon solidiyying from the melt 36 is again of P-type conductivity with a resistivity of about 100 ohm centimetres at room temperature. If it were desired to maintain the resistivity of the N-type region substantially constant, it would be possible to achieve this by suitable control of the atmosphere in the enclosure during the growth of the N-type region so as substantially to suppress the evaporation of antimony from the molten silicon 36 during this period.

The operations of introducing antimony into the molten silicon 36 by dropping a pellet of antimony from one of the apertures in the plate 34, growing a short region of N-type conductivity, and then halting the growth while allowing the remainder of the antimony to evaporate from the molten silicon 36, are repeated several times during the growing of the single crystal, so that the resultant single crystal contains a number of regions which are alternately of P-type and N-type conductivity. In order to ensure that all the transitions from P-type to N-type material are substantially identical, and similarly for all the transitions from N-type to P-type material, the amount of antimony which is added is progressively reduced on each occasion, according to the amount of silicon remaining molten, so that the concentration of antimony in the molten silicon 36 has substantially the same value immediately after each addition of antimony. The process is terminated when substantially all the molten silicon 36 has been withdrawn from the crucible 7.

It will be appreciated that a single crystal prepared by a method such as is described above may be cut up to provide a large number of small silicon bodies each containing one or more P–N junctions.

We claim:

1. In a method of producing a semiconductor body in which a molten mass of silicon is progressive solidified: the improvement including the step of forming in the resultant body at least one transition between a region having N-type conductivity and a region having P-type conductivity by evaporating during the solidification from the molten silicon an appreciable quantity of antimony which has previously been incorporated in the molten silicon.

2. In a method of producing a semiconductor body in which a molten mass of silicon is progressively solidified: causing a series of transitions to occur in the manner specified in claim 1 at different stages during the solidification, and adding antimony to the molten silicon at appropriate stages during the solidification so that the concentration of antimony in the molten silicon has substantially the same value immediately prior to each evaporation operation, the evaporation operations being carried out so that the concentration of antimony in the molten silicon has substantially the same value immediately after each evaporation operation.

3. In a method of producing a semiconductor body in which a molten mass of silicon is progressively solidified: causing at least one transition to occur in the manner specified in claim 1, the evaporation being brought about by maintaining the molten silicon in a continuously evacuated enclosure.

4. In the improvement set forth in claim 1 in a method of producing a semiconductor body: the additional step of maintaining the interface between the solid and molten silicon stationary during the evaporation of the antimony.

5. In the improvement set forth in claim 1 in a method of producing a semiconductor body: the additional step of maintaining the interface between the solid and molten silicon stationary until substantially all the antimony in the molten silicon evaporates.

6. In the improvement set forth in claim 1 in a method of producing a semiconductor body: the additional step of maintaining the molten mass at a constant temperature during evaporation of the antimony.

References Cited in the file of this patent

UNITED STATES PATENTS

| | | |
|---|---|---|
| 2,730,470 | Shockley | Jan. 10, 1956 |
| 2,798,989 | Welker | July 9, 1957 |

FOREIGN PATENTS

| | | |
|---|---|---|
| 203,695 | Australia | Sept. 29, 1955 |